United States Patent [19]

Brandenstein et al.

[11] Patent Number: 4,673,301
[45] Date of Patent: Jun. 16, 1987

[54] SUPPORTING MEMBER

[75] Inventors: Manfred Brandenstein, Eussenheim; Roland Haas, Hofheim; Rudiger Hans, Niederwerrn, all of Fed. Rep. of Germany

[73] Assignee: SKF Kugellagerfabriken GmbH, Schweinfurt, Fed. Rep. of Germany

[21] Appl. No.: 583,840

[22] Filed: Feb. 27, 1984

[30] Foreign Application Priority Data

Mar. 30, 1983 [DE] Fed. Rep. of Germany ....... 3311558

[51] Int. Cl.⁴ .................... F16C 35/04; F16H 7/10
[52] U.S. Cl. ..................... 384/428; 474/112
[58] Field of Search ........... 308/216, DIG. 3; 384/428, 418; 474/112, 196, 197, 199; 267/160, 161, 162

[56] References Cited

U.S. PATENT DOCUMENTS

| | | | |
|---|---|---|---|
| 1,323,490 | 12/1919 | Putnam | 474/112 |
| 1,362,363 | 12/1920 | Steenstrup | 474/196 |
| 1,541,410 | 6/1925 | Cowley | 308/DIG. 3 |
| 1,990,806 | 2/1935 | Watson et al. | 384/418 |
| 3,211,016 | 10/1965 | Carter | 474/197 |
| 3,504,849 | 4/1970 | Quinn | 267/161 X |
| 3,868,151 | 2/1975 | Derner | 384/569 |
| 4,054,339 | 10/1977 | Ladin | 384/569 |
| 4,268,096 | 5/1981 | Cain et al. | 384/428 |
| 4,269,400 | 5/1981 | Jensen | 267/160 X |
| 4,322,063 | 3/1982 | Fischbeck et al. | 267/160 |
| 4,355,791 | 10/1982 | Dean | 267/161 X |
| 4,457,740 | 7/1984 | Olschewski et al. | 474/112 |
| 4,512,673 | 4/1985 | Condon, Jr. et al. | 384/569 |

FOREIGN PATENT DOCUMENTS

| | | | |
|---|---|---|---|
| 21123 | of 1895 | United Kingdom | 474/112 |
| 12599 | of 1897 | United Kingdom | 474/112 |
| 2086000 | 5/1982 | United Kingdom | 474/112 |
| 2102531 | 2/1983 | United Kingdom | 02001983/GBX |

Primary Examiner—Stuart S. Levy
Assistant Examiner—Lynn M. Sohacki
Attorney, Agent, or Firm—Rosen, Dainow & Jacobs

[57] ABSTRACT

A support housing for a tension roller formed as a one-piece deep drawn sheet metal cylindrical sleeve having a bottom end part which includes an eccentric bore therethrough, part of the bottom being axially displaced for increased stiffness and stability.

1 Claim, 3 Drawing Figures

SUPPORTING MEMBER

BACKGROUND OF THE INVENTION

This invention is directed to the field of tension rollers on pulleys for rotatably supporting a belt with adjustable tension, and is more in particular directed to a pin or supporting member of the type disclosed in published U.K. Patent Application No. 2,102,531, wherein a conventional rolling bearing is mounted on a sleeve-shaped section or housing having a bottom or end wall having an eccentrically disposed bore. The entire tension roller may be swung about the shaft of the bolt extending through the bore for tightening the belt rotatably supported by means of the bearing, and the bolt may attach the tension roller to a housing. In a similar embodiment, disclosed in published U.K. Patent Application No. 2,103,332, the inner race of the rolling bearing is incorporated directly into the sleeve-shaped section. Tension rollers of this type are also disclosed in U.S. Pat. No. 4,457,740.

In both of these known embodiments the sleeve-shaped housing is made of one piece deep-drawn sheet metal, the bottom part having essentially the same thickness as the cylindrical walls and lying essentially in a radial plane. When the tension rollers are attached the bottom of the supporting member is heavily stressed by the head of the bolt. To prevent the bottom from bending under such stress in the known embodiments, they are designed to comprise a relatively thick wall. In one-piece designs such a supporting member requires the use of a metal sheet of overall greater thickness than that absolutely necessary for the cylindrical wall section which has a basically more stable geometric shape than the bottom part. In addition, the eccentric position of the attaching bolt likewise results in a non-coaxial stress of the bottom which increases the risk of misalignment of the entire tension roller. The high cost of such thicker material and the increased difficulty of manufacture with such material for producing sufficiently stable conditions provides reason for seeking a cheaper solution.

An object of the invention is to provide a supporting member of the type mentioned above which can use thinner sheet metal while still having satisfactory resistance to deformation of the bottom of the supporting member.

SUMMARY OF THE INVENTION

The above-noted object is accomplished in that the bottom of the supporting member, with essentially unaltered thickness of sheet metal, has at least some sections displaced axially out of the radial plane. This considerably increases the bending resistance of the bottom. The axial stress acting on the bottom owing to the head of the attaching bolt, is no longer received by a continously flat surface, but is in part divided into radial force components by sections displaced axially in space, which force components are absorbed by the cylindrical walls. Thus the bottom and hence the entire supporting member may be made of thinner sheet metal, as a result of which a considerable amount of labor costs in deep-drawing of the supporting member pursuant to the invention and, in addition, material saved. Moreover, the lighter processing of thinner metal also requires considerably simpler tools.

In one embodiment of the invention the bottom is curved convexly outward. In this case the axial stress of the head of the bolt acting on the bottom results in force components directed radially from the center outward to the cylindrical sleeve-shaped section. Extreme stiffness of the bottom is thereby, obtained, since the sleeve-shaped section must first widen considerably before the bottom can bend. However, such widening of the sleeve-section is prevented by its basically stable geometric shape and in addition by the bearing inner ring mounted thereon.

In another example of the invention the bottom has axially embossed linear or flat sections which may possibly be designed as corrugations to produce strengthening equivalent to a correspondingly thicker bottom. A plurality of small or large surface embossments may be selected depending upon the application.

The invention is described by means of the examples represented in the drawing attached hereto.

DETAILED DESCRIPTION OF THE PREFERRED EMBODIMENT

Figure 1:
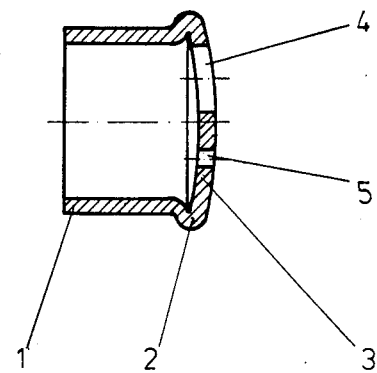
FIG. 1 shows a longitudinal section of a supporting member or housing with a convexly curved bottom.

The supporting member for a tension roller represented in FIG. 1 is generally pot-shaped or cup-shaped member of sheet metal designed and deep drawn in one piece. It consists of a cylindrical sleeve-shaped section 1 and a bottom 3 formed on and connected by a toroidal shoulder or flange 2. The sleeve-shaped section or wall 1 serves as seat for a bearing which is not shown. The bottom 3 is curved convexly outward and has an eccentrically disposed bore 4 for a bolt, not shown, by way of which the supporting member and hence the tension roller is attached to a housing or the like. The supporting member is pivoted about the shaft of the bolt as required for adjustment purposes in accordance with conventional techniques . To this end, additional smaller bores 5 are provided in the bottom 3 for the insertion of an adjusting tool. Although the bottom or floor 3 and hence the entire supporting member is made of relatively thin metal, high stiffness is provided due to the convex curvature. Any axial stress acting on the bottom 3 due to the head of the bolt in the region of the bore is partially divided into forces directed radially from the center outward to the toroidal shoulder 2 and hence to the sleeve-shaped section 1. These forces are counteracted by the stiffness of the sleeve-shaped section 1 and of the mounted bearing. Flattening of the bottom 3 from its convex shape is thereby prevented.

Figure 2:
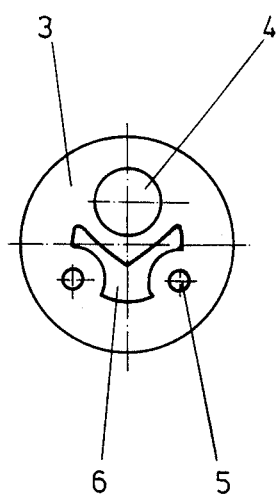
FIG. 2 shows an end elevation view of the bottom of a supporting member with a flat embossed section.
Figure 3:
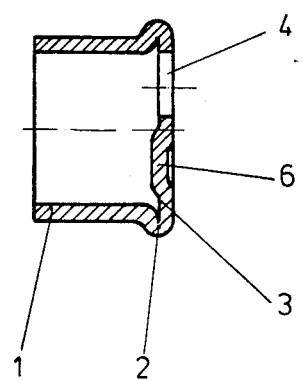
FIG. 3 shows a longitudinal section of the supporting member represented in FIG. 2.

In the second embodiment of the supporting member represented in FIGS. 2 and 3, the bottom 3 has a flat embossed section 6 between the separate bores 4 and 5. The particular shape of the surface results from the position of the bores 4 and 5. The embossed material increases the stiffness of the bottom which will be resistant to bending in the area where the bolt engages the bottom for attachment of this support member.

We claim:

1. In a supporting member for mounting a tension roller comprising a one-piece deep-drawn sheet metal housing formed as a cylinder about a longitudinal axis with a bottom defining a generally radial plane transverse of said axis at one end of said cylinder, said bottom having an eccentric mounting bore; the improvement wherein said bottom has a diameter greater than that of said cylinder to define a radially outwardly extending flange at the junction of said bottom with said cylinder, said bottom having substantially constant thickness and having an embossed portion displaced from said bore axially out of said radial plane whereby the stiffness of said bottom is increased, said bottom defining two additional bores spaced apart from each other and from said eccentrically displaced bores, said axially displaced portion being situated in part radially between said two additional bores and in part between said eccentric bore and said two additional bores, said axially displaced section having a generally Y shape with the stem of the Y between said additional bores, and said eccentrically disposed bore between the arms of said Y.

* * * * *